United States Patent
Lee

(10) Patent No.: US 9,172,859 B2
(45) Date of Patent: Oct. 27, 2015

(54) CAMERA MODULE AND METHOD FOR INSPECTING HORIZONTALITY OF OBJECT AND THE CAMERA MODULE

(71) Applicant: LG INNOTEK CO., LTD., Seoul (KR)

(72) Inventor: Yong Hun Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 150 days.

(21) Appl. No.: 13/712,577

(22) Filed: Dec. 12, 2012

(65) Prior Publication Data

US 2013/0147989 A1  Jun. 13, 2013

(30) Foreign Application Priority Data

Dec. 13, 2011  (KR) ................. 10-2011-0133869

(51) Int. Cl.
| | | |
|---|---|---|
| *H04N 5/235* | (2006.01) | |
| *H04N 5/76* | (2006.01) | |
| *H04N 5/228* | (2006.01) | |
| *H04N 9/083* | (2006.01) | |
| *H04N 3/14* | (2006.01) | |
| *H04N 5/232* | (2006.01) | |
| *G01B 11/00* | (2006.01) | |
| *G06T 7/00* | (2006.01) | |

(52) U.S. Cl.
CPC .............. *H04N 5/232* (2013.01); *G01B 11/002* (2013.01); *G06T 7/0046* (2013.01); *G06T 2207/10004* (2013.01); *G06T 2207/30244* (2013.01)

(58) Field of Classification Search
CPC ..... H04N 5/907; H04N 9/083; H04N 3/1525; H04N 9/077; H04N 5/3532; H04N 5/323
USPC ........... 348/231.99, 230.1, 222.1, 231.2, 289, 348/295, 296
See application file for complete search history.

(56) References Cited

U.S. PATENT DOCUMENTS

| | | | | |
|---|---|---|---|---|
| 6,806,903 | B1* | 10/2004 | Okisu et al. .................... | 348/254 |
| 8,401,274 | B2* | 3/2013 | Hazeyama et al. ........... | 382/147 |
| 2002/0027604 | A1* | 3/2002 | Hung ............................. | 348/239 |
| 2005/0243197 | A1* | 11/2005 | Kitaguchi et al. ....... | 348/333.12 |
| 2009/0297025 | A1* | 12/2009 | Murayama et al. ........... | 382/167 |
| 2011/0069160 | A1* | 3/2011 | Ning ............................... | 348/65 |
| 2012/0188407 | A1* | 7/2012 | Chou ....................... | 348/231.99 |

* cited by examiner

*Primary Examiner* — Sinh Tran
*Assistant Examiner* — Xi Wang
(74) *Attorney, Agent, or Firm* — Birch, Stewart, Kolasch & Birch, LLP

(57) ABSTRACT

Exemplary embodiments of a camera module are proposed, the camera module including an image sensor photographing a object image, a memory unit stored with a look-up table recorded with pixel number of the object image corresponding to a length of the object, and an image signal processor detecting a pixel number of the object image photographed by the image sensor, reading out a length of a object corresponding to the detected pixel number from the memory unit and inspecting horizontality of the image sensor and the object.

8 Claims, 4 Drawing Sheets

CAMERA MODULE AND METHOD FOR INSPECTING HORIZONTALITY OF OBJECT AND THE CAMERA MODULE

Pursuant to 35 U.S.C. §119 (a), this application claims the benefit of earlier filing date and right of priority to Korean Patent Application No. 10-2011-0133869, filed on Dec. 13, 2011, contents of which are hereby incorporated by reference in its entirety.

BACKGROUND OF THE DISCLOSURE

1. Field of the Disclosure

The teachings in accordance with exemplary embodiments of the present disclosure generally relate generally to a camera module and a method for inspecting horizontality of object and the camera module.

2. Discussion of the Related Art

This section provides background information related to the present disclosure which is not necessarily prior art.

Generally, a camera module includes a lens unit including lenses, a housing assembly coupled to the lens unit, and a sensor unit including an IR (Infrared) filter and an image sensor. After a camera module is assembled, the camera module photographs an object, performs an image test, measures a device or measures position information of the device.

At this time, there may occurs a problem of a measured data being distorted, in a case the camera module and the object are not horizontally positioned. The horizontality of the camera module and the object is an important factor to characteristic data measured by the camera module, such that it is imperative to develop and research techniques for reducing distortion of characteristic data.

SUMMARY OF THE DISCLOSURE

This section provides a general summary of the disclosure, and is not a comprehensive disclosure of its full scope or all of its features.

Exemplary aspects of the present disclosure are to substantially solve at least the above problems and/or disadvantages and to provide at least the advantages below. Accordingly, an aspect of the present disclosure provides a camera module and a method for inspecting horizontality of object and the camera module configured to prevent characteristic data of the camera module from being distorted due to distorted horizontality of the camera module and a object.

It should be emphasized, however, that the present disclosure is not limited to a particular disclosure, as explained above. It should be understood that other technical objects not mentioned herein may be appreciated by those skilled in the art.

In one general aspect of the present disclosure, there is provided a camera module, the camera module comprising: an image sensor photographing an object image; a memory unit stored with a look-up table recorded with pixel number of the object image corresponding to a length of the object; and an image signal processor detecting a pixel number of the object image photographed by the image sensor, reading out a length of an object corresponding to the detected pixel number from the memory unit and inspecting horizontality of the image sensor and the object.

Preferably, but not necessarily, the look-up table may be recorded, in a state of the camera module and the object being horizontally positioned, with the pixel number of object image that is extracted in correspondence with the length of the object from the object image photographed by the image sensor of the camera module.

Preferably, but not necessarily, the image signal processor may determine that the camera module and the regular polygonal object are not mutually horizontal, in a case a length of a side is different from a length of a facing side, in case of the object being in a shape of a regular polygon.

Preferably, but not necessarily, the image signal processor may determine a tilt degree of the camera module and the regular polygonal object, in a case there is a degree of difference in between the lengths of sides of the regular polygonal object.

Preferably, but not necessarily, the image signal processor may obtain a tilt degree of a particular direction of the regular polygon using a length of a side of the regular polygon.

In another general aspect of the present disclosure, there is provided a method for inspecting horizontality of object and a camera module, the method comprising: photographing an object image; detecting a pixel number of the photographed object image; and inspecting horizontality of the camera module and the object using a length of an object corresponding to the detected pixel number.

Preferably, but not necessarily, the method may further comprise, after inspecting the horizontality of the camera and the object using the length of the object corresponding to the detected pixel number, measuring an angle (θ) of the object based on the camera module using a formula of "tan θ=actual distance difference between two sides/a length when actual sides are parallel with the camera".

Preferably, but not necessarily, the step of inspecting the horizontality of the camera and the object using the length of the object corresponding to the detected pixel number may include inspecting the horizontality of the image sensor and the object by reading out the length of the object corresponding to the detected pixel number from a memory unit.

Preferably, but not necessarily, the step of inspecting the horizontality of the camera and the object using the length of the object corresponding to the detected pixel number may include determining that the camera module and a regular polygonal object are not mutually horizontal, in a case the object is the regular polygonal object and a length of a side is different from a length of a facing side.

Preferably, but not necessarily, the step of inspecting the horizontality of the camera and the object using the length of the object corresponding to the detected pixel number may include determining a tilt degree of the camera module and the regular polygonal object, in a case there is a degree of difference in between the lengths of sides of the regular polygonal object, or obtaining a tilt degree of a particular direction of the regular polygon using a length of a side of the regular polygon.

The present disclosure has an advantageous effect in that data measuring characteristic of a camera module can be prevented from being distorted by inspecting a horizontality of the camera module and an object.

Other exemplary aspects, advantages, and salient features of the disclosure will become more apparent to persons of ordinary skill in the art from the following detailed description, which, taken in conjunction with the annexed drawings, discloses exemplary embodiments of the invention.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

Hereinafter, exemplary embodiments of the present disclosure will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 1:
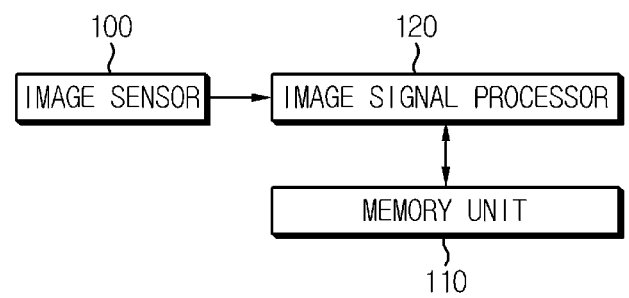
FIG. 1 is a block diagram illustrating a camera module according to an exemplary embodiment of the present disclosure.

FIG. 1 is a block diagram illustrating a camera module according to an exemplary embodiment of the present disclosure.

The camera module according to an exemplary embodiment of the present disclosure includes an image sensor (100) photographing a object image, a memory unit (110) stored with a look-up table recorded with pixel number of the object image corresponding to a length of the object, and an image signal processor (120) detecting a pixel number of the object image photographed by the image sensor (100), reading out a length of an object corresponding to the detected pixel number from the memory unit (110) and inspecting horizontality of the image sensor (100) and the object.

Thus, the camera module photographs an object image using the image sensor, and the image signal processor (120) detects the pixel number of the object image photographed by the image sensor (100), reads out the length of the object corresponding to the detected pixel number from the memory unit (110), and inspects horizontality of the image sensor and the object.

Accordingly, the exemplary embodiment of the present disclosure has an advantage of inspecting horizontality of the image sensor and the object to prevent data measuring the characteristic of the camera module from being distorted. That is, in case of a result of the image sensor and the object not being horizontal is obtained, the data measured by the camera module is deleted, or corrected to thereby enhance reliability of characteristic data.

Figure 2:
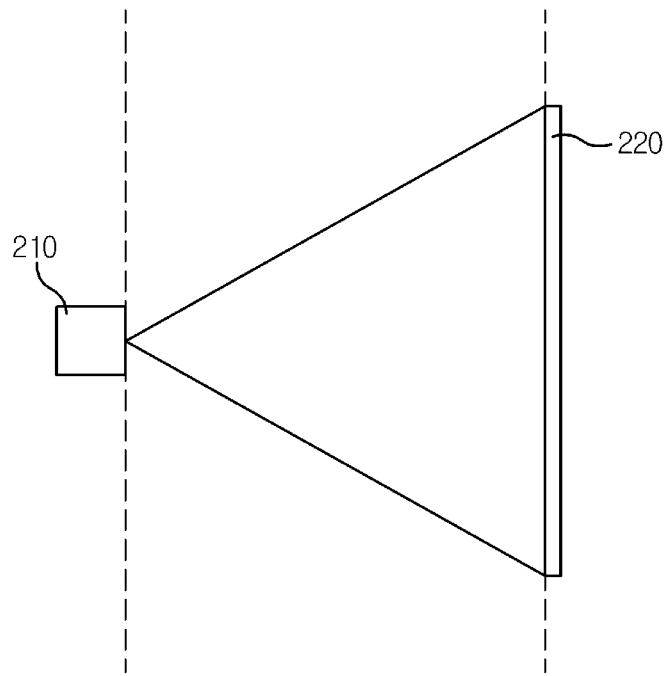
FIG. 2 is a lateral view illustrating a horizontal state of a camera module and an object according to an exemplary embodiment of the present disclosure.
Figure 3:
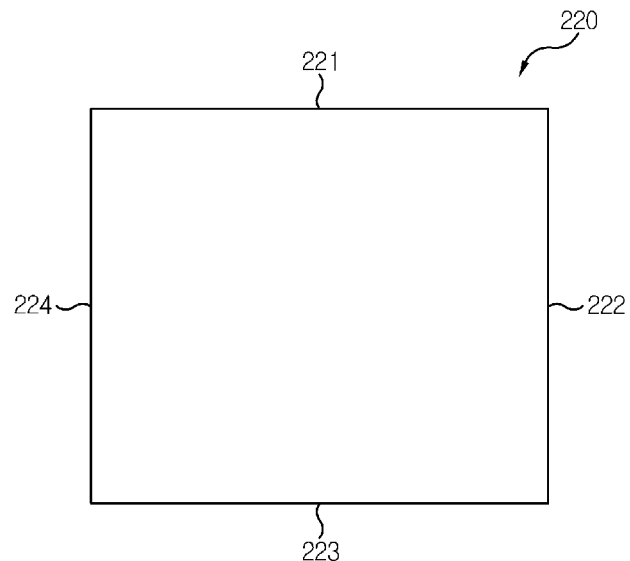
FIG. 3 is a schematic view illustrating an image of an object photographed by a camera module, in a state of a camera module and an object being horizontal, according to an exemplary embodiment of the present disclosure.
Figure 4:
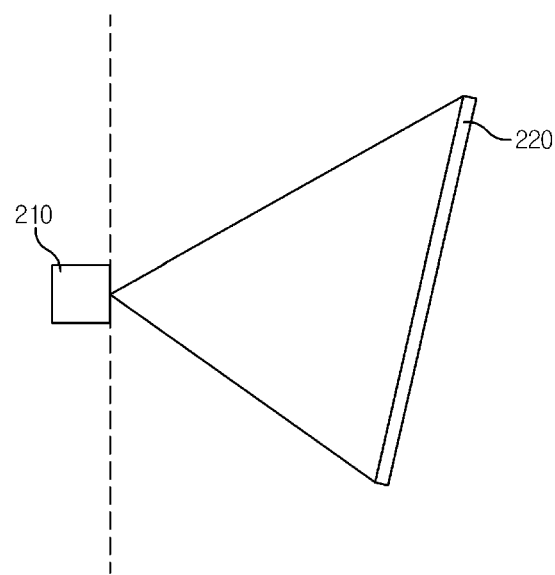
FIG. 4 is a lateral view illustrating that a camera module and an object are horizontal according to an exemplary embodiment of the present disclosure.
Figure 5:
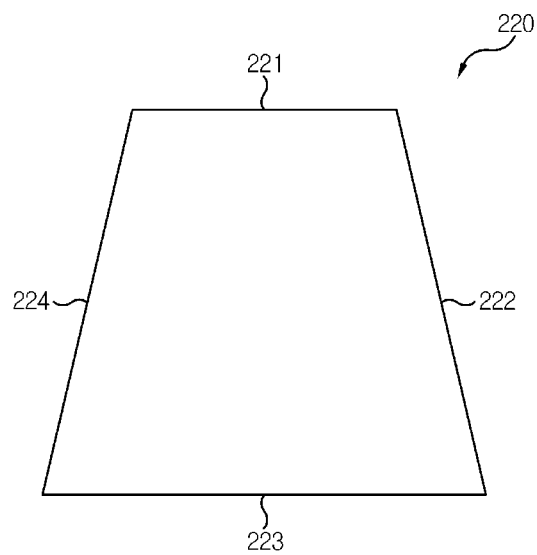
FIG. 5 is a schematic view illustrating an image of an object photographed by a camera module, in a state of a camera module and an object not being horizontal, according to an exemplary embodiment of the present disclosure.

FIG. 2 is a lateral view illustrating a horizontal state of a camera module and an object according to an exemplary embodiment of the present disclosure, FIG. 3 is a schematic view illustrating an image of an object photographed by a camera module, in a state of a camera module and an object being horizontal, according to an exemplary embodiment of the present disclosure, FIG. 4 is a lateral view illustrating that a camera module and an object are horizontal according to an exemplary embodiment of the present disclosure, and FIG. 5 is a schematic view illustrating an image of an object photographed by a camera module, in a state of a camera module and an object not being horizontal, according to an exemplary embodiment of the present disclosure.

As noted from the foregoing, the exemplary embodiment of the present disclosure is to detect the pixel number of the object image photographed by the image sensor, and to inspect the horizontality of the image sensor and the object using the length of the object corresponding to the detected pixel number from the memory unit.

Furthermore, the memory unit is stored with a look-up table recorded with pixel number of the object image corresponding to the length of the object.

At this time, as illustrated in FIG. 2, in a state of an camera module (210) and an object (220) being horizontal, the look-up table is such that the pixel number of the object image corresponding to the length of the object is extracted from the object image photographed by an image sensor of the camera module (210), which is then recorded.

That is, in a case the number of sides of the object is even number, where the object takes a shape of a square, hexagon or a pentagon, each side has a same length. For example, as illustrated in FIG. 3, in case of the object being a square object (220), a side '221' and a side '223' have the same length, and a side '222' and a side '24' are of the same length.

Thus, as illustrated in FIG. 4, in a state of the camera module (210) and the object (220) not being horizontal, the square object (220) is photographed as an image of a trapezoidal shape, as shown in FIG. 5.

In another exemplary embodiment of the present disclosure, in case of an object being of a regular polygon, and in case of lengths of sides in the regular polygon being different, it may be determined by the image signal processor (120) that the camera module (210) is tilted to the regular polygonal object (220).

The image signal processor (120) may determine a degree of tilt, in case of the lengths of sides in the regular polygon being different. Furthermore, the image signal processor may obtain a tilt degree of a particular direction of the regular polygon using an extracted length of a side of the regular polygon.

Referring to FIG. 1 again, in case of an object being of a regular polygon, and in case of lengths of facing sides in the regular polygon being different, it may be determined by the image signal processor (120) that the camera module (210) is tilted to the regular polygonal object (220). At this time, it may be determined that the camera module (210) and the regular polygonal object (220) are not horizontal.

Furthermore, in case of there being a degree of difference in the lengths of sides in the regular polygonal object (220), the image signal processor (120) may determine the tilt degree of the camera module (210) and the regular polygonal object (220). Still furthermore, the image signal processor (120) may obtain a tilt degree of a particular direction of the regular polygon using a length of a side of the regular polygon.

Figure 6:
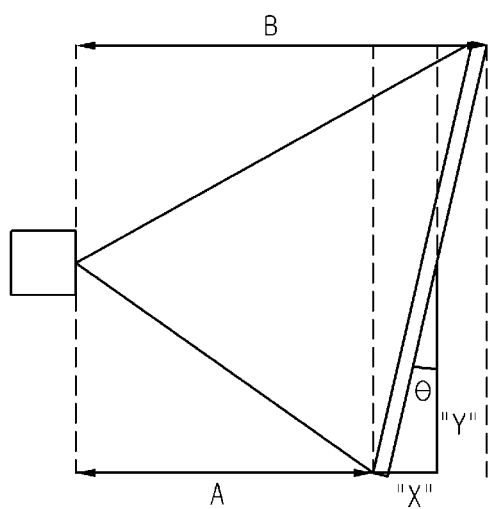
FIG. 6 is a conceptual lateral view illustrating a method of measuring an angle of an object based on a camera module according to an exemplary embodiment of the present disclosure.

FIG. 6 is a conceptual lateral view illustrating a method of measuring an angle of an object based on a camera module according to an exemplary embodiment of the present disclosure.

In a case lengths of sides of object, the pixel number of object image and distance between camera module and object are recorded in the look-up table stored in the memory unit as in Table 1, an angle of object can be measured.

TABLE 1

| Length of object(Cm) | Pixel number of object image | Distance between camera module and object(cm) |
|---|---|---|
| 10 | 10 | 50 |
|  | 12 | 54 |
|  | 14 | 58 |
| 11 | 11 | 52 |
|  | 13 | 56 |
|  | 14 | 60 |

That is, an angle (θ) of the object may be calculated based on the camera module using a formula of "tan θ=actual distance difference between two sides/a length when actual sides are parallel with the camera".

Figure 7:
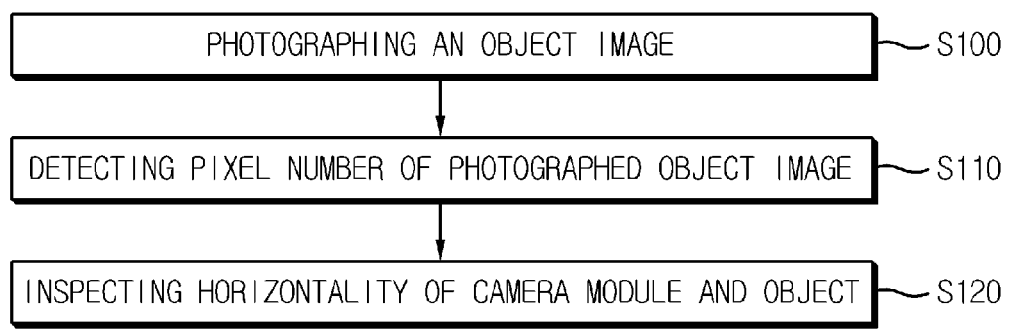
FIG. 7 is a flowchart illustrating a method for inspecting horizontality of an object and a camera module according to an exemplary embodiment of the present disclosure.

FIG. 7 is a flowchart illustrating a method for inspecting horizontality of an object and a camera module according to an exemplary embodiment of the present disclosure.

The method for inspecting horizontality of an object and a camera module according to an exemplary embodiment of the present disclosure first includes photographing an object image (S100).

Next, a pixel number of the photographed object image is detected (S110). Successively, horizontality of the camera module and the object is inspected using a length of an object corresponding to the detected pixel number (S120).

The method may further comprise a step of measuring an angle (θ) of the object based on the camera module using a formula of "tan θ=actual distance difference between two sides/a length when actual sides are parallel with the camera", after inspecting the horizontality of the camera and the object using the length of the object corresponding to the detected pixel number.

At this time, the step of inspecting the horizontality of the camera and the object using the length of the object corresponding to the detected pixel number a step of determining that the camera module and a regular polygonal object are not mutually horizontal, in a case the object is the regular polygonal object and a length of a side is different from a length of a facing side.

Furthermore, the step of inspecting the horizontality of the camera and the object using the length of the object corresponding to the detected pixel number may be a step of determining a tilt degree of the camera module and the regular polygonal object, in a case there is a degree of difference in between the lengths of sides of the regular polygonal object, or obtaining a tilt degree of a particular direction of the regular polygon using a length of a side of the regular polygon.

The above-mentioned camera module and method for inspecting horizontality of object and the camera module according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A camera module comprising:
   an image sensor photographing an object image;
   a memory unit stored with a look-up table recorded with pixel number of the object image corresponding to a length of the object; and
   an image signal processer detecting a pixel number of the object image photographed by the image sensor, reading out a length of an object corresponding to the detected pixel number from the memory unit and inspecting horizontality of the image sensor and the object based on the length of the object read out,
   wherein the look-up table is recorded, in a state of the camera module and the object being horizontally positioned, with the pixel number of object image that is extracted in correspondence with the length of the object from the object image sensor of the camera module.

2. The camera module of claim 1, wherein the image signal processor determines that the camera module and the regular polygonal object are not mutually horizontal, in a case a length of a side is different from a length of a facing side, in case of the object being in a shape of a regular polygon.

3. The camera module of claim 1, wherein the image signal processor determines a tilt degree of the camera module and the regular polygonal object, in a case there is a degree of difference in between the lengths of sides of the regular polygonal object.

4. The camera module of claim 1, wherein the image signal processor obtains a tilt degree of a particular direction of the regular polygon using a length of a side of the regular polygon.

5. A method for inspecting horizontality of object and a camera module, the method comprising:
   photographing an object image;
   detecting a pixel number of the photographed object image; and
   inspecting horizontality of the camera module and the object using a length of an object corresponding to the detected pixel number,
   wherein the step of inspecting the horizontality of the camera and the object using the length of the object corresponding to the detected pixel number includes inspecting the horizontality of the image sensor and the object by reading out the length of the object corresponding to the detected pixel number from a memory unit stored with a look-up table recorded with pixel number of the object image corresponding to a length of the object, and wherein the look-up table is recorded, in a state of the camera module and the object being horizontally positioned, with the pixel number of object image that is extracted in correspondence with the length of the object from the object image photographed by the image sensor of the camera module.

6. The method of claim 5, further comprising, after inspecting the horizontality of the camera and the object using the length of the object corresponding to the detected pixel number, measuring an angle ($\theta$) of the object based on the camera module using a formula of "tan $\theta$=actual distance difference between two sides/a length when actual sides are parallel with the camera".

7. The method of claim 5, wherein the step of inspecting the horizontality of the camera and the object using the length of the object corresponding to the detected pixel number includes determining that the camera module and a regular polygonal object are not mutually horizontal, in a case the object is the regular polygonal object and a length of a side is different from a length of a facing side.

8. The method of claim 5, wherein the step of inspecting the horizontality of the camera and the object using the length of the object corresponding to the detected pixel number includes determining a tilt degree of the camera module and the regular polygonal object, in a case there is a degree of difference in between the lengths of sides of the regular polygonal object, or obtaining a tilt degree of a particular direction of the regular polygon using a length of a side of the regular polygon.

* * * * *